United States Patent

Chang

[11] Patent Number: 5,990,840
[45] Date of Patent: Nov. 23, 1999

[54] SIGNAL RECEIVING GAIN DEVICE FOR CAR MOBILE-PHONES

[75] Inventor: Daniel Chang, Pa-Te, Taiwan

[73] Assignee: Auden Technology Mfg. Co., Ltd., Taiwan

[21] Appl. No.: 08/815,345

[22] Filed: Mar. 11, 1997

[51] Int. Cl.⁶ .............................. H01Q 1/32; H04M 1/100
[52] U.S. Cl. ........................ 343/713; 379/446; 343/715
[58] Field of Search ................................ 343/713, 715, 343/729, 730, 876, 878, 879, 702; 455/403

[56] References Cited

U.S. PATENT DOCUMENTS

| | | | |
|---|---|---|---|
| 3,403,404 | 9/1968 | Berger et al. | 343/713 |
| 5,059,971 | 10/1991 | Blaese | 343/713 |
| 5,600,333 | 2/1997 | Justice et al. | 343/713 |
| 5,708,706 | 1/1998 | Hughes et al. | 379/446 |

Primary Examiner—Hoanganh Le
Assistant Examiner—James Clinger
Attorney, Agent, or Firm—Dougherty & Troxell

[57] ABSTRACT

A signal receiving gain device for car mobile-phones, is comprised of a main body which includes a housing, an insertion connecting pipe is extended out from one end of the housing for inserting in an electric socket provided in a car, the housing can hold therein an electric circuit board of which one end is connected to the insertion connecting pipe, the opposite end of the housing to the insertion connecting pipe is connected with an amplifying emitting antenna and an external antenna of the car respectively. When the external antenna receives a signal of the frequency within the specified range, a gain signal is obtained and is emitted by the amplifying emitting antenna, this further elevates the signal receiving capability of a mobile-phone in the car.

2 Claims, 4 Drawing Sheets

SIGNAL RECEIVING GAIN DEVICE FOR CAR MOBILE-PHONES

BACKGROUND OF THE INVENTION

1. Field of the Invention

The present invention is related to a signal receiving gain device for car mobile-phones, and especially to one which can increase the signal receiving capability of a mobile-phone in a car.

2. Description of the Prior Art

The signal receiving capability of a mobile-phone in a car is relatively unsatisfactory, so that an external antenna normally is added on a car. The best signal receiving structure now used is a mobile-phone with an additional connector which is connected to the external antenna on the car, thereby the external antenna can be used directly as the signal receiving antenna of the mobile-phone.

In the existing connectors of mobile-phones for connecting to external car antennae, the pen cap shaped connectors are of the most common type. They are each a sleeve in a shape and a size corresponding to those of mobile-phones, a down extending press sheet is provided on the sleeve to connect with the contact points of the socket on the back of a mobile-phone to enhance signal receiving capability. Such connectors are subjected to the defect of loosening and thus are unstable structurally. Therefore, there are now improved press connected connectors. Whatever the style of connector is used, since it is only a simple connection between a mobile-phone to an external car antenna, no active gain function is provided.

SUMMARY OF THE INVENTION

The object of the present invention is to provide a a signal receiving gain device for car mobile-phones, which device has a main body comprising two half housings assembled mutually oppositely, the main body being provided with an insertion connecting pipe to insert in a socket in a car, an electric circuit board in the housing of the main body, one end of the electric circuit board connected to a component of the insertion connecting pipe, while the other end thereof is connected to an external antenna and an amplifying emitting antenna respectively. Thus, when a mobile-phone receives a specified frequency, the frequency is cascade ampified to allow the gain signal to be emitted by the amplifying emitting antenna, thereby the signal receiving capability of the car mobile-phone actively increases. This is the main motive of the present invention.

The present invention will be apparent in its novelty and other characteristics after reading the detailed description of the preferred embodiments thereof in reference to the accompanying drawings.

DETAILED DESCRIPTION OF THE PREFERRED EMBODIMENT

Figure 1:
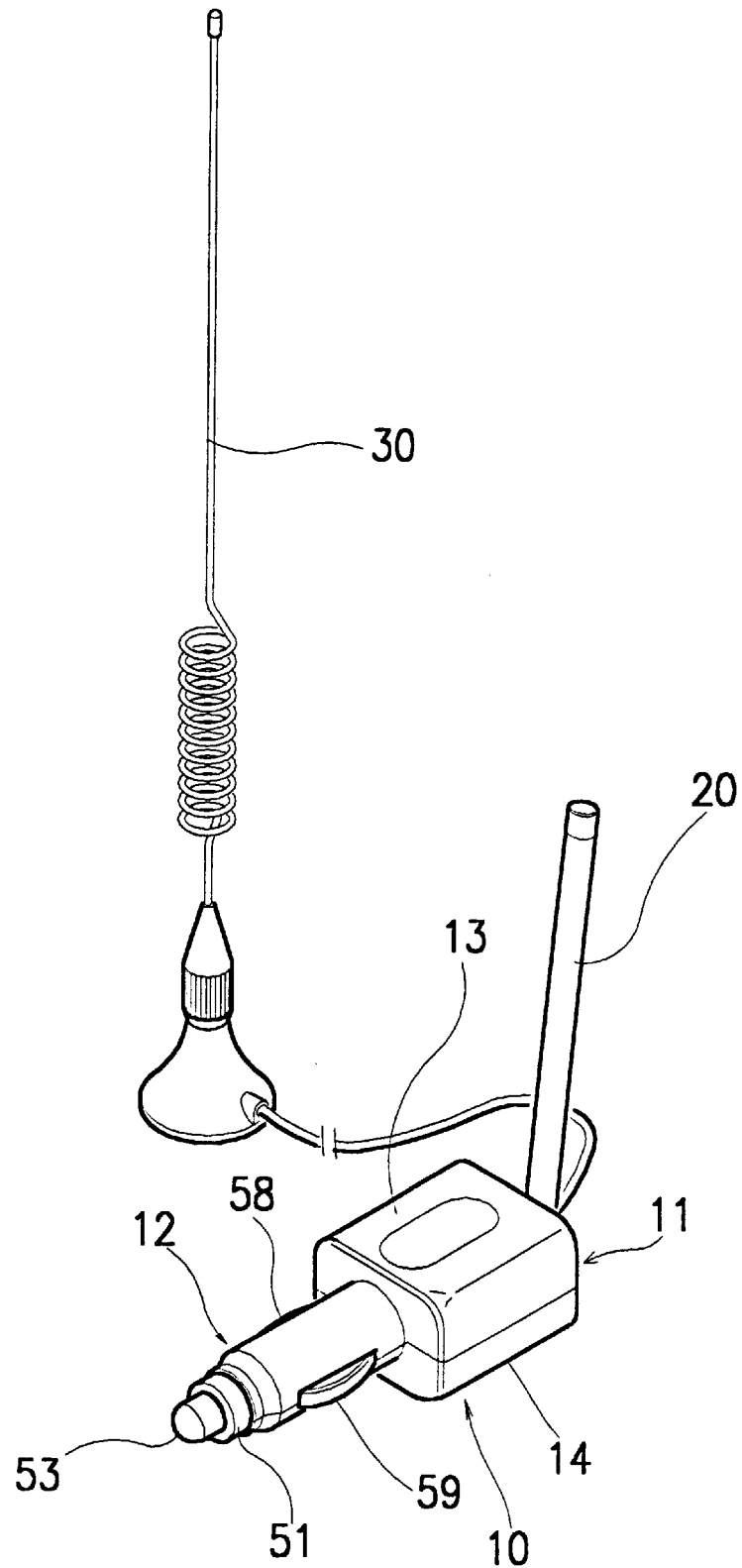
FIG. 1 is a perspective view of an embodiment of the present invention.

Referring to FIG. 1, the present invention is comprised generally of a main body 10 which includes a housing 11 in conformity in size to an electric circuit board, an insertion connecting pipe 12 extending out from one end of the housing 11, the insertion connecting pipe 12 (the so called cigar head) can be inserted in an electric socket (not shown) already provided in a car. The opposite end of the housing 11 to the insertion connecting pipe 12 is connected with an amplifying emitting antenna 20 and an external antenna 30 of the car respectively.

Figure 2:
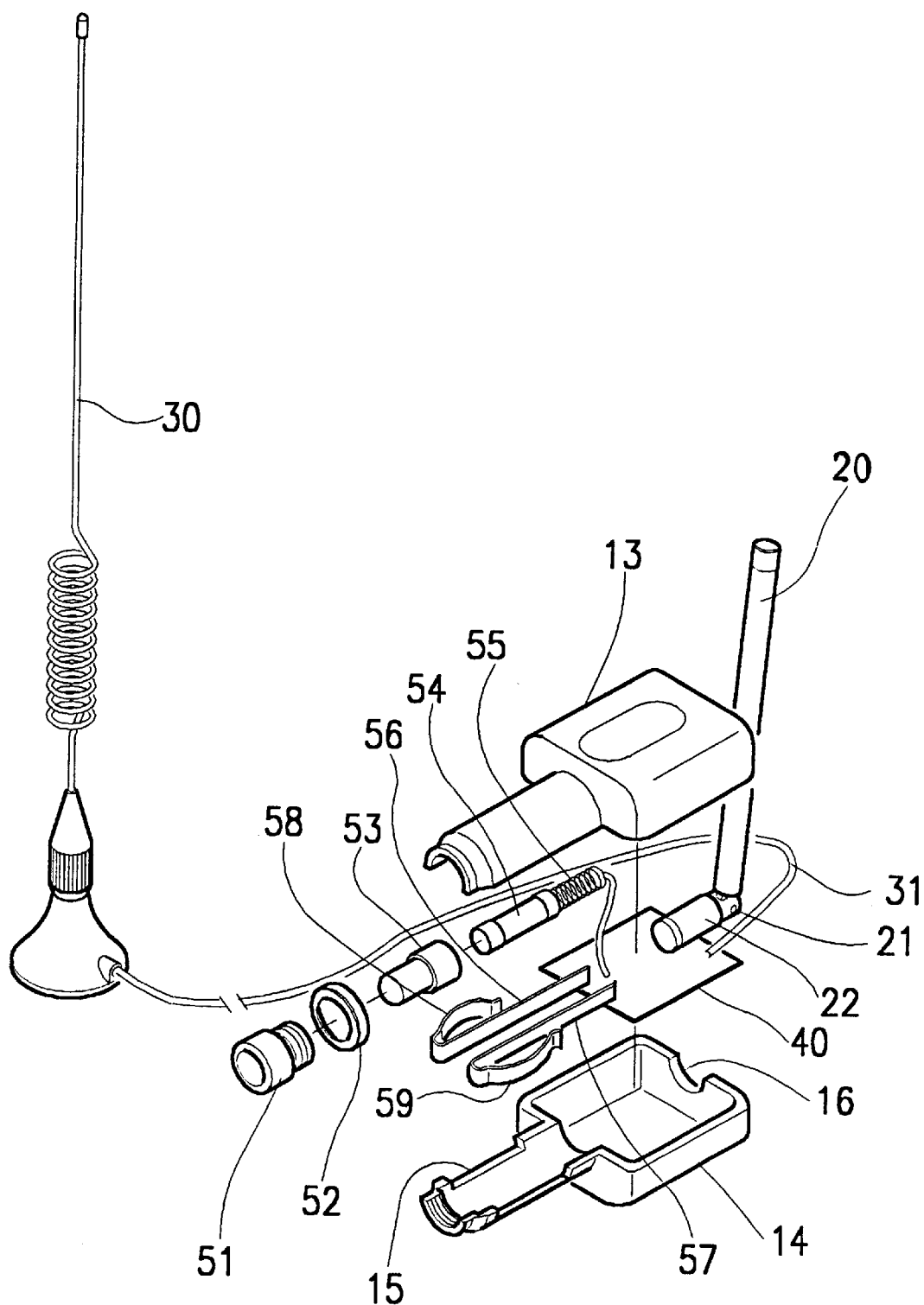
FIG. 2 is an exploded perspective view of the elements composing the embodiment of FIG. 1.

As shown in FIG. 2, the main body 10 is comprised of two hollow half housings 13, 14 assembled oppositely mutually to form the above mentioned housing 11 and the insertion connecting pipe 12. An electric circuit board 40 is placed in housing 11, the insertion connecting pipe 12 is provided therein from the front to the rear thereof with the members required for the cigar head: a fixing cap 51, a locating ring 52, a contact copper sleeve 53, a fuse 54, a pole 55, and a pair of elastic polar sheets 56, 57 of which the front bending portions 58, 59 are exposed out from the lateral slots 15 provided on the insertion connecting pipe 12 to form the construction as shown in FIG. 1 after assembling.

The conductor of the above mentioned pole 55 and one end of each of the elastic polar sheets 56, 57 are connected respectively to one end of the electric circuit board 40, the other end of the electric circuit board 40 being connected to one end of the amplifying emitting antenna 20 and one end of the conductor 31 of the external antenna 30 respectively. In the preferred embodiment shown in these drawings, the amplifying emitting antenna 20 is connected with a short connecting end 22 through a pivotal connector 21. The short connecting end 22 can be welded to the above mentioned other end of the electric circuit board 40 after extending through a hole 16 provided on the housing 11.

Figure 3:
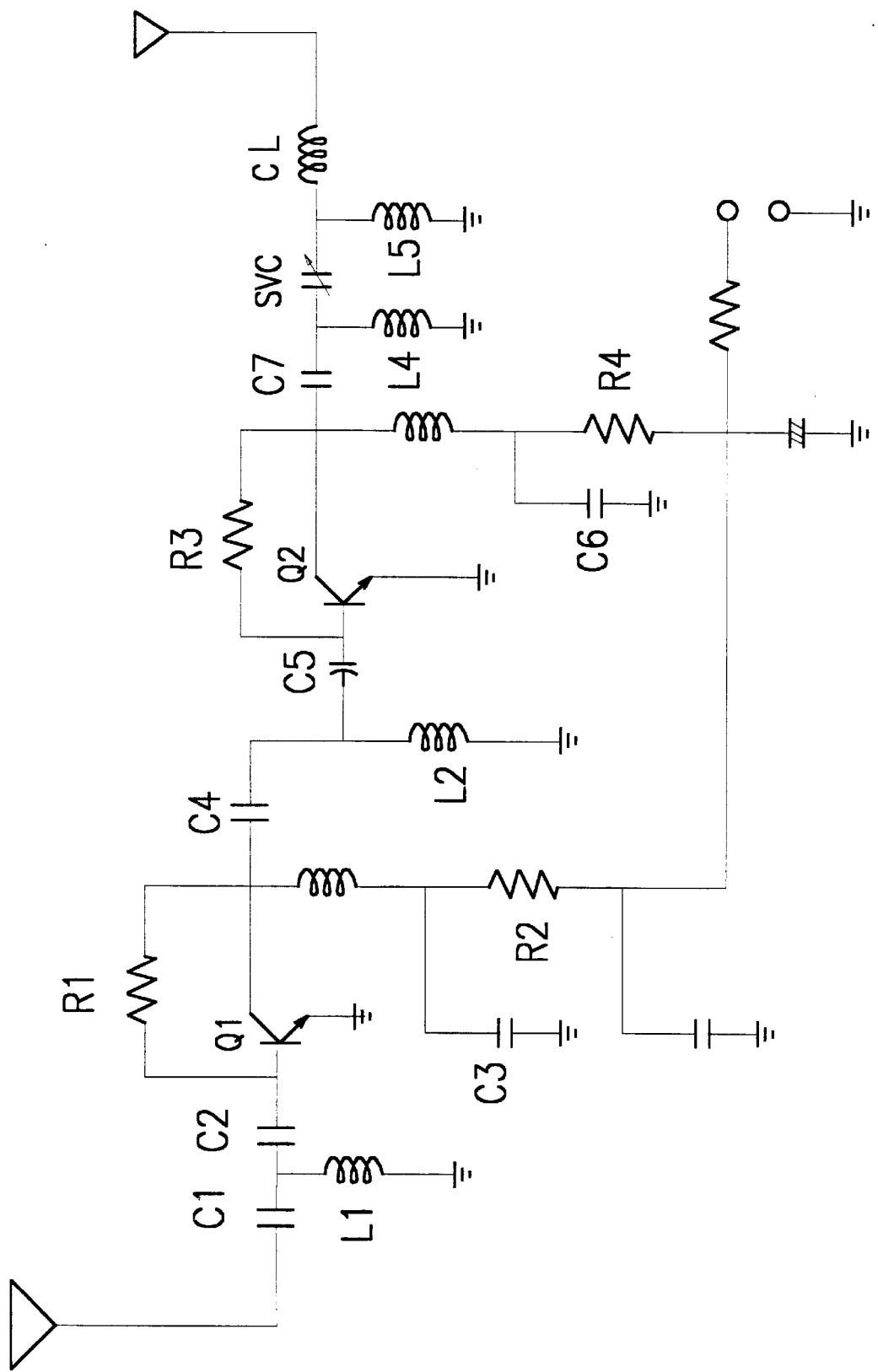
FIG. 3 is an electric circuit-usable in the embodiment of FIGS. 1 and 2.

Referring to FIG. 3, in the electric circuit usable in the embodiment of the present intention, frequency received is limited to a specified range of frequency through C1, C2 and L1. When the external antenna 30 receives a signal of the frequency within the specified range is cascade connected through C1 and C2, it is delivered to a transistor Q1 to primarily amplify the voltage there of. The amplified signal is then delivered through C4 nd C5 to a transistor Q2. The voltage signal is cascade amplified by Q1 and Q2 to obtain the gain signal, and is emitted by the amplifying emitting antenna 20, its range of frequency is determined by the SVC, L4 and L5, and its range of output gain frequency can be adjusted by the SVC to the best state.

Figure 4:
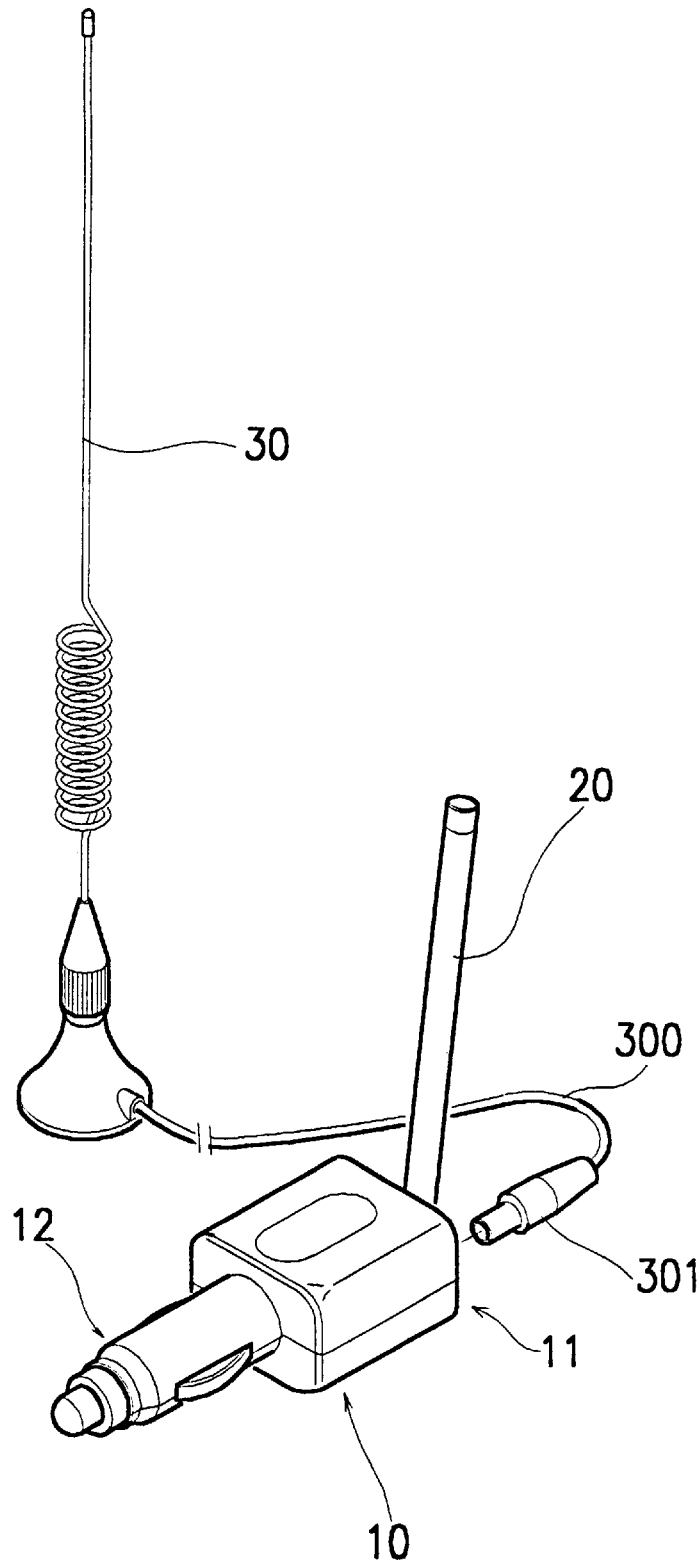
FIG. 4 shows another embodiment of the present invention.

In another embodiment of the present invention referring to FIG. 4, a plug 301 is provided on the end of a conductor 300 of the external antenna 30 to be used with an antenna originally provided externally of the car, and is insertable in the socket provided on the corresponding end of the main body 10.

The signal received by the present invention through the antenna provided externally of the car can be emitted from the emitting antenna 20 on an end of the main body 10 after being sent into the electric gain circuit of the main body 10, thereby to largely elevate the signal receiving capability of a mobile-phone in the car, and to further increase the quality of communication.

Having thus described the technical structure of my invention with industrial value, what I claim as new and desire to be secured by Letters Patent of the United States is:

I claim:

1. A signal receiving gain device for car mobile-phones, said device comprising a main body which includes a housing, with an insertion connecting pipe extending from one side of said housing and configured to be inserted into an electric socket provided in a car; an electric gain circuit board located within said housing and connected to said insertion connecting pipe, said electric gain circuit board comprising a limiting device for receiving frequencies only within a predetermined range and a cascade amplifier connected to an adjustable frequency ranging device for adjusting emitting frequency: an external antenna configured to be located externally of the car; an amplifying emitting antenna assembly located within the car, said amplifying emitting antenna assembly comprising a short connecting end connected to said electric circuit board and extending through said housing, and an amplifying emitting antenna pivotally connected to said short connecting end by a pivotal connection so as to pivot relative to said short connecting end, the amplifying emitting antenna extending exteriorly of the housing; and a cable conductor connected to the external antenna and to the electric gain circuit board.

2. The signal receiving gain device for car mobile-phones as claimed in claim 1, wherein, said cable conductor connected to said external antenna further comprises a plug removably inserted in a socket provided on said main body.

* * * * *